Figure 1:
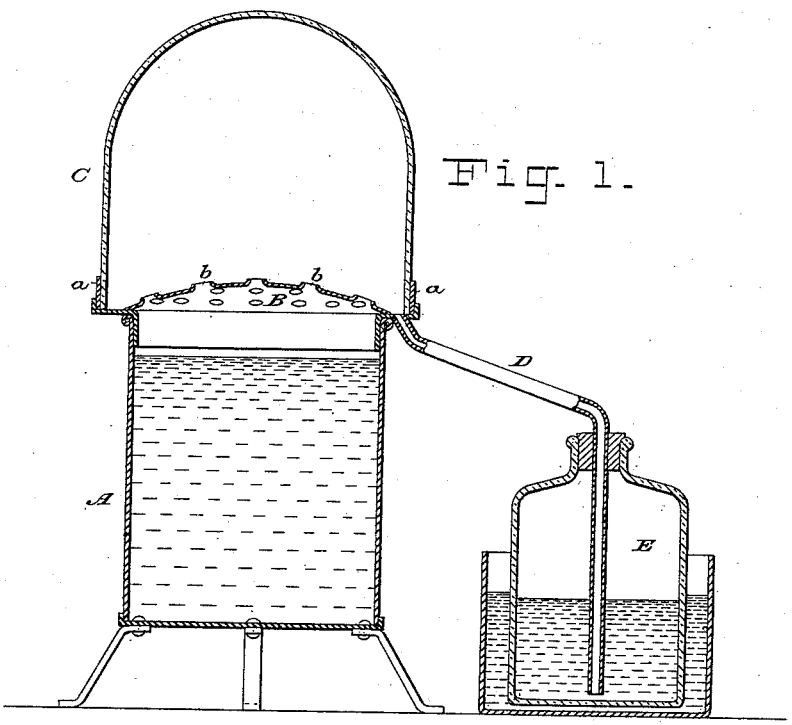

(No Model.)

H. HALVORSON.
METHOD OF DIVIDING AND DISTILLING CRUDE PETROLEUM.

No. 305,180. Patented Sept. 16, 1884.

WITNESSES:

INVENTOR:
Halvor Halvorson
By his Attorneys,
Burke, Fraser

United States Patent Office.

HALVOR HALVORSON, OF NASHUA, NEW HAMPSHIRE, ASSIGNOR, BY DIRECT AND MESNE ASSIGNMENTS, TO THE HALVORSEN PROCESS COMPANY, OF NEW YORK, N. Y.

METHOD OF DIVIDING AND DISTILLING CRUDE PETROLEUM.

SPECIFICATION forming part of Letters Patent No. 305,180, dated September 16, 1884.

Application filed November 10, 1883. (No model.)

*To all whom it may concern:*

Be it known that I, HALVOR HALVORSON, a citizen of the United States, and a resident of Nashua, in the county of Hillsborough and State of New Hampshire, have invented a new and Improved Method of Dividing and Distilling Crude Petroleum, of which the following is a specification.

My method of treating crude petroleum, or petroleum as it comes from the receiving-tanks at the wells in oil-producing districts, effects a separation of the oil into two parts having distinct and independent characteristics. The proportion which these parts bear to the whole amount of the petroleum treated varies somewhat with oils from different localities; but with what is known as "Bradford" oil, from Pennsylvania, I obtain about forty-two per cent. of what I designate "primary" oil and about fifty-eight per cent. of what I designate "secondary" oil. Some of the crude oils, however, do not yield so much of the primary oil, and the average yield of the latter will not exceed thirty-five per cent. Before describing these two divisions of the crude oil and the distillates obtained from the secondary oil, I will explain my method of separation or division in its simplest form. I take any quantity of the crude petroleum and mix with it commercial benzine previously distilled from petroleum. I prefer to employ about equal parts of the benzine and crude petroleum, as a less proportion of benzine does not, I think, remove all of the primary oil, while a greater proportion is, I think, unnecessary. This mixture of crude oil and benzine is placed in an open vessel, and the latter in a larger open vessel. The mixture is now submitted to a temperature sufficiently high to evaporate the benzine, when the benzine volatilizes and leaves the mixture, carrying with it about forty-two per cent. of the crude oil, which it drops in the outer vessel. After the benzine has all evaporated it will be found that the mass of crude petroleum has been divided, the forty-two per cent. carried over and deposited in the outer vessel being what I characterize as "primary" oil, and the fifty-eight per cent. which remains in the inner vessel being what I have called the "secondary" oil. The benzine has passed off as a gas or vapor.

The above description sets forth my method of dividing or separating the crude oil in its simplest form, and without reference to the recovery of the benzine; but I may employ the apparatus shown in the accompanying drawings, wherein the benzine may be wholly recover and the separation effected more rapidly at somewhat higher temperatures.

Figure 2:
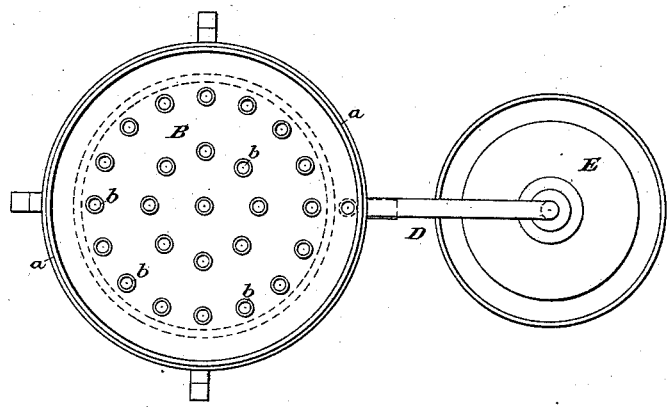

In the drawings, Figure 1 is a vertical midsection of the apparatus. Fig. 2 is a plan of the same with the dome removed.

Let A represent a vessel of any kind; B, a convex cover for the same, provided with a rim, *a*, and perforations *b*, with elevated margins; C, a dome, which may be of glass, so as to enable the operation to be seen; D, a pipe or spout to convey away the mixture of benzine and primary oils, and E a vessel to receive the latter.

If desired, the vessel A may be heated slightly—say below a temperature of 130° Fahrenheit—and the vessel E may, if necessary, be refrigerated. The mixture of crude oil and benzine is placed in A, and in volatilizing the benzine carries the primary oil up through the perforations *b*. The mixture condenses on the cover B, is collected by the rim *a*, and flows through pipe D into E. The benzine is then separated from the primary oil by the ordinary process of distillation, and may thus be wholly recovered. The primary oil obtained by this process cannot be distilled without decomposition, thickens at temperatures which do not affect the crude oil and secondary oil, is soluble in sulphuric acid without division, filters to an orange shade through bone-black, burns well in lamps suited to animal oils, possesses great excellence as a lubricator, and has a density of about 31° Baumé. I consider this primary oil as the nucleus of paraffine (which does not exist normally in petroleum in crystalline form) and the source of the non-condensable gases evolved by the ordinary destructive distillation of crude oil. The fifty-eight per cent. of secondary oil left in the inner vessel has a density of about 36° Baumé.

This oil is placed in a still and subjected to the usual process of fractional distillation. It distills quietly without the evolution of non-condensable gases. The first distillate—naphtha—is light, but not so light as ordinary benzine. This I let run until the temperature in the still rises to about 250° Fahrenheit, when I change the receiver, the distillation being uninterrupted until the thermometer indicates 550° Fahrenheit. This second distillate is kerosene. The receiver is now changed again and the distillation carried to about 620° Fahrenheit. This third distillate is what I denominate "petro-sperm," or "300" oil. The distillates up to 550° are limpid and almost colorless, and that from 550° to 620° is of a brownish color. The residue left in the still is a heavy oil which stands high when tested as a lubricant.

Assuming that I obtain from the crude oil an average of thirty-five per cent. of primary oil and sixty-five per cent. of secondary oil, I obtain by division and distillation the following-named products, in about the proportion given, from one hundred per cent. of average crude oil: primary oil, 31° Baumé, thirty-five per cent.; naphtha, first distillate, 65° Baumé, three per cent.; kerosene, second distillate, 50° Baumé, forty per cent.; petro-sperm, third distillate, 36° Baumé, six per cent.; lubricant, residual, 27° Baumé, sixteen per cent. Total, one hundred per cent.

I obtain no tar or waste products in the distillation.

The kerosene (second distillate) is treated with a small quantity of sulphuric acid, about five per cent. to ninety-five per cent. of the oil, and when the "sludge" has subsided and has been drawn off and the supernatant oil becomes clear a small portion of the acid will have remained in combination with an element or portion of the oil. To remove this I agitate the oil with a small quantity of alcohol, which mixes or combines with the said mixture of acid and oil and carries it to the bottom. The oil will now be clear and limpid, entirely free from fluorescence, neutral to test-paper, and stand a fire-test of about 130°. The loss by the acid treatment is only about three per cent., which is much less than that resulting from the ordinary treatment with acid, and the kerosene is almost odorless.

The employment of alcohol to remove the acid, in lieu of alkalies, renders the oil whiter and less odorous. The alcohol mixture settles to the bottom of the purifying-tank, and may be readily withdrawn. After the alcohol mixture is withdrawn, water is added to it in about equal quantity, by preference, and a small quantity of a light hydrocarbon separates and rises to the top, when it may be removed. This product I have not carefully examined; but when first obtained it is nearly colorless, changing afterward to a brown yellow. This substance appears to be the source of the color in the kerosene, and the alcohol, in removing it, acts as a bleaching agent. This product has a slight empyreumatic odor, which is wanting in the purified kerosene. The alcohol is wholly recovered by distillation over an alkali or other base capable of taking up the acid.

The 300 oil (third distillate) is treated in substantially the same manner as the kerosene, and is a light-yellow oil which stands a fire-test of 300°. This oil burns readily in lamps constructed to burn what is known as "mineral sperm-oil;" but it does not chill so readily, contains no crystalline paraffine, and does not form a crust on the wick. It is nearly odorless and has a density of about 36° Baumé. The oil remaining in the still (residual) has a density of 27° Baumé, and resembles in many respects the "reduced oil" known to the trade. It filters readily, and, as before stated, is a good lubricating-oil.

In the first step of my process, which is also the most important, as it controls those which follow, I have said that I employ benzine to separate the primary from the secondary oil. I will add that I prefer this of all the lighter products of petroleum for the following reasons. The lighter products—such as rhigolene, gasoline, &c., will carry over a part of the primary oil; but they appear to volatilize at too low temperatures to be very effective. Kerosene, on the other hand, will not serve, owing, as I believe, to its greater specific gravity. I prefer then, as producing the best results, that product of petroleum having a density of about 71° Baumé, and which I call "commercial benzine."

I have described herein the products resulting from the carrying out of my process, but I do not herein claim them, so far as they are patentable or distinguishable from other petroleum products in common use. I have claimed them in two applications, one filed November 10, 1883, and numbered 111,437, and the other filed March 12, 1884, and numbered 123,943.

The main and most important feature of my invention is the separation, primarily, of the portion I have designated as "primary" oil. It is this product which, as I believe, is the source of all the difficulties incident to the present methods of distilling crude petroleum, and the source of the waste or nearly worthless products. By my method this primary oil becomes a very valuable product, and, more than this, the secondary oil becomes quite as valuable to the distiller as would be the entire mass of crude petroleum from which it is obtained. It produces no waste products, and yields about the same amount of illuminating-oil as could be obtained if the primary oil had not been removed, and this illuminating-oil is of better quality than that usually obtained, being free from fluorescence and empyreumatic odors.

Having thus described my invention, I claim—

1. The herein-described process for dividing crude petroleum into two parts, designated "primary" and "secondary" oils, which consists in mixing together crude petroleum and benzine and volatilizing the benzine, whereby it is caused to carry over with it the primary oil, leaving the secondary oil behind, as set forth.

2. The herein-described method of dividing and distilling crude petroleum, which consists in first separating the primary oil by the means substantially as described, and then subjecting the secondary oil which remains behind to fractional distillation, substantially as set forth.

3. The herein-described method of purifying the distillates derived from the secondary oil, which consists in first mixing the distillate with a small quantity of sulphuric acid and then removing the acid remaining in the distillate by means of alcohol, substantially as set forth.

In witness whereof I have hereunto signed my name in the presence of two subscribing witnesses.

HALVOR HALVORSON.

Witnesses:
 HENRY CONNETT,
 ARTHUR C. FRASER.